United States Patent
Egan et al.

(10) Patent No.: US 9,467,445 B2
(45) Date of Patent: Oct. 11, 2016

(54) SYSTEMS AND METHODS FOR GROUP AUTHENTICATION

(71) Applicant: LAUNCHKEY, INC., Las Vegas, NV (US)

(72) Inventors: Devin M. Egan, Las Vegas, NV (US); Yo Sub Kwon, Las Vegas, NV (US); Geoffrey R. Sanders, Las Vegas, NV (US); Christopher C. Shepherd, Las Vegas, NV (US); Kristin F. Tomasik, Las Vegas, NV (US)

(73) Assignee: LAUNCHKEY, INC., Las Vegas, NV (US)

( * ) Notice: Subject to any disclaimer, the term of this patent is extended or adjusted under 35 U.S.C. 154(b) by 0 days.

(21) Appl. No.: 14/535,196

(22) Filed: Nov. 6, 2014

(65) Prior Publication Data

US 2015/0135286 A1 May 14, 2015

Related U.S. Application Data

(60) Provisional application No. 61/901,718, filed on Nov. 8, 2012.

(51) Int. Cl.
*G06F 7/04* (2006.01)
*H04L 29/06* (2006.01)

(52) U.S. Cl.
CPC .......... *H04L 63/0884* (2013.01); *H04L 63/20* (2013.01)

(58) Field of Classification Search
CPC .......................... H04L 63/20; H04L 63/0227

USPC .............................................................. 726/5
See application file for complete search history.

(56) References Cited

U.S. PATENT DOCUMENTS

| | | | | |
|---|---|---|---|---|
| 2002/0156785 | A1* | 10/2002 | Kumar | G06F 11/0709 |
| 2003/0005297 | A1* | 1/2003 | Fichtner | G06F 21/6236 713/168 |
| 2009/0019534 | A1* | 1/2009 | Bakshi | G06F 21/335 726/6 |
| 2012/0023561 | A1* | 1/2012 | Saida | G06F 21/31 726/6 |
| 2013/0291071 | A1* | 10/2013 | Blom | H04L 9/0833 726/4 |

* cited by examiner

*Primary Examiner* — Teshome Hailu
(74) *Attorney, Agent, or Firm* — One LLP (57) ABSTRACT

The field of the invention relates to network connected authentication systems, and more particularly to systems and methods that enable authentication of one or more users of a group using network connected devices. In an embodiment, the system includes a network connected authentication server coupled to a network for access by a plurality of user devices in a group to authenticate a user of one or more third party applications. When a user of the group visits a third party application and initiates a group authentication, the network connected authentication server retrieves authentication rules and sends authentication requests to the user devices of the group based on the authentication rules. When the network connected authentication server receives authentication responses from the user devices, the network connected authentication server sends the responses to the third party application, which determines whether approval should be granted based on the responses and on the policies of the third party application.

10 Claims, 8 Drawing Sheets

SYSTEMS AND METHODS FOR GROUP AUTHENTICATION

CROSS-REFERENCE TO RELATED APPLICATIONS

The present application claims priority to U.S. Provisional Application No. 61/901,718, filed Nov. 8, 2013, which is hereby incorporated by reference in its entirety.

FIELD OF THE INVENTION

The field of the invention relates to network connected authentication systems, and more particularly to systems and methods that enable authentication of one or more users of a group using network connected devices.

BACKGROUND OF THE INVENTION

As society becomes more interconnected where people and entities can interact through network connected platforms, the ability to give one's approval and the ability to access a resource together with others, for example, as a group, are desired even when the people are not in the immediate vicinity of one another. For example, a child may want to receive permission from two parents to watch a movie, but neither one of the parents is present. Another example is where business partners wishing to sign off on large financial transactions together while working remotely from one another. In yet another example, separate individuals located in various locations may wish to access the same webpage for the same account at the same time. Some other situations require not the approval of all parties, but a certain percentage, even if only the minority. For example, updating software may require approval from only some developers and a single project manager. Upon a suggested change, parties may want to quickly approve or veto it with a vote. Another situation may require knowledge of which users of a group acknowledge something to be true or wish to opt into something. This could be for agreeing to terms and conditions or responding to invitation to an event.

Current solutions are often built specifically to solve an individual problem and cannot be applied elsewhere without major changes. Such solutions include calling multiple people to ask for approval, or physically meeting with others and giving verbal approval. Some approval systems require a single person to approve an action with signature then send it to the next person in a chain of approval. If somewhere along the chain there is a denial, it will have to go all the way back to the beginning of the chain to restart. Current voting solutions simply measure the volume of cheering, or quick hands raised estimate. In the case of shared accounts, an individual linked to a single account has to share a password or the details required for authentication. This is becoming increasingly difficult with secure means of authentication requiring multiple factors that are not so easily shared between users. For example, the two-man rule is a control mechanism that requires the presence of two authenticated people in order to obtain access or perform an action. Shamir's secret sharing is a cryptographic algorithm that allows secret sharing by dividing a secret into parts and giving each participant its own unique part where all the parts need to be combined to reconstruct the secret. Also, a separate system of auditing access has to be logged in order to keep track of which users had access to the account at specific times.

On the other hand, accounts are often tied to groups rather than individuals and the policies that define their access may include one or many of the members of the group. Even more often, accounts are tied to or meant for individuals when it is the desire of a multi-user entity to be represented as such with access available to the entirety of its members and not just an individual.

Accordingly, it is desirable to provide systems and methods for an authentication platform that maps users to a group and device to users, with the capability to send authentication requests to user devices within that group. The authentication platform also has a configurable set of policies as to what defines a successful group authentication.

SUMMARY OF THE INVENTION

The field of the invention relates to network connected authentication systems, and more particularly to systems and methods that enable authentication of one or more users of a group using network connected devices.

In an embodiment, the system includes a network connected authentication server system communicatively coupled to a network for access by a plurality of user devices in a group to authenticate a user visiting one or more third party applications, and a database coupled to the network connected authentication server system to store information including user identifiers, third party application identifiers, authentication rules, and so on. When a user of the group visits a third party application and initiates a group authentication, the network connected authentication server system receives a group identifier and a third party application identifier from the third party application. The network connected authentication server system retrieves authentication rules from the database based on the group identifier and the third party application identifier. The network connected authentication server system then sends authentication requests to one or more user devices of the group based on the authentication rules. When the network connected authentication server system receives authentication responses from the one or more user devices of the group, the network connected authentication server system sends the responses to the third party application, which determines whether approval should be granted based on the responses and the policies of the third party application.

In another embodiment, when multiple users of the group visit a third party application and initiate a group authentication, the network connected authentication server system receives identifiers of the multiple users and a third party application identifier from the third party application. The network connected authentication server system retrieves authentication rules from the database based on the identifiers and the third party application identifier. The network connected authentication server system then sends authentication requests to one or more user devices of the group based on the authentication rules. When the network connected authentication server system receives authentication responses from the one or more user devices of the group, the network connected authentication server system sends the responses to the third party application, which determines whether approvals should be granted based on the responses and the policies of the third party application.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 1:
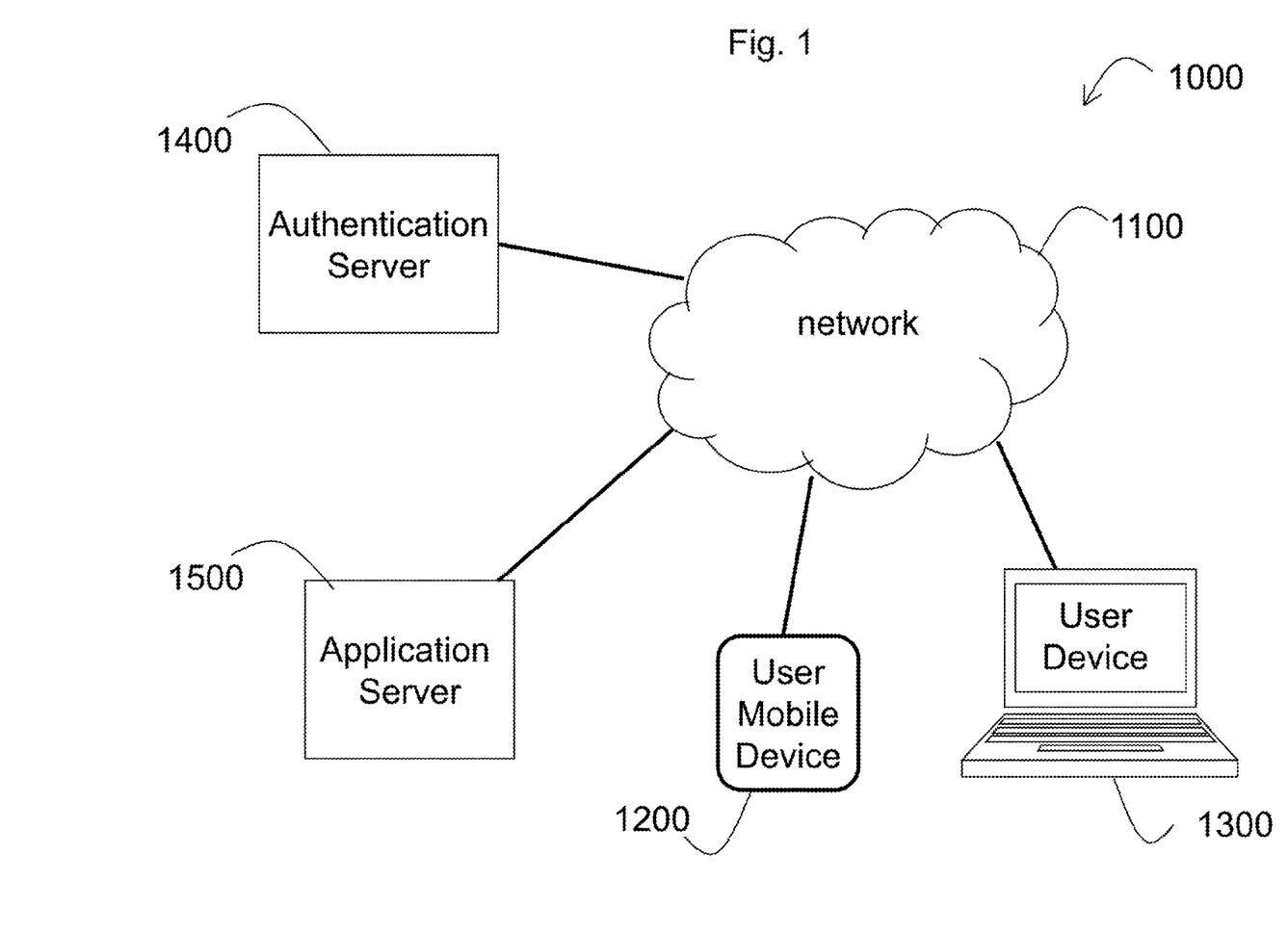
FIG. 1 is an exemplary diagram of a network connected authentication platform according to an embodiment of the present invention.

Turning to FIG. 1, a network connected authentication platform 1000 according to an embodiment of the present invention is shown. The platform 1000 generally includes an authentication server system 1400 and a third party application server system 1500, both may be distributed on one or more physical servers, each having one or more processors, memory, an operating system, and input/output interface, and a network interface all known in the art, and a plurality of end user devices 1200, 1300 coupled to a network 1100, such as a public network (e.g., the Internet and/or a cellular-based wireless network) or a private network. The user devices include, for example, mobile device 1200, desktop or laptop device 1300, and so on.

Figure 2:
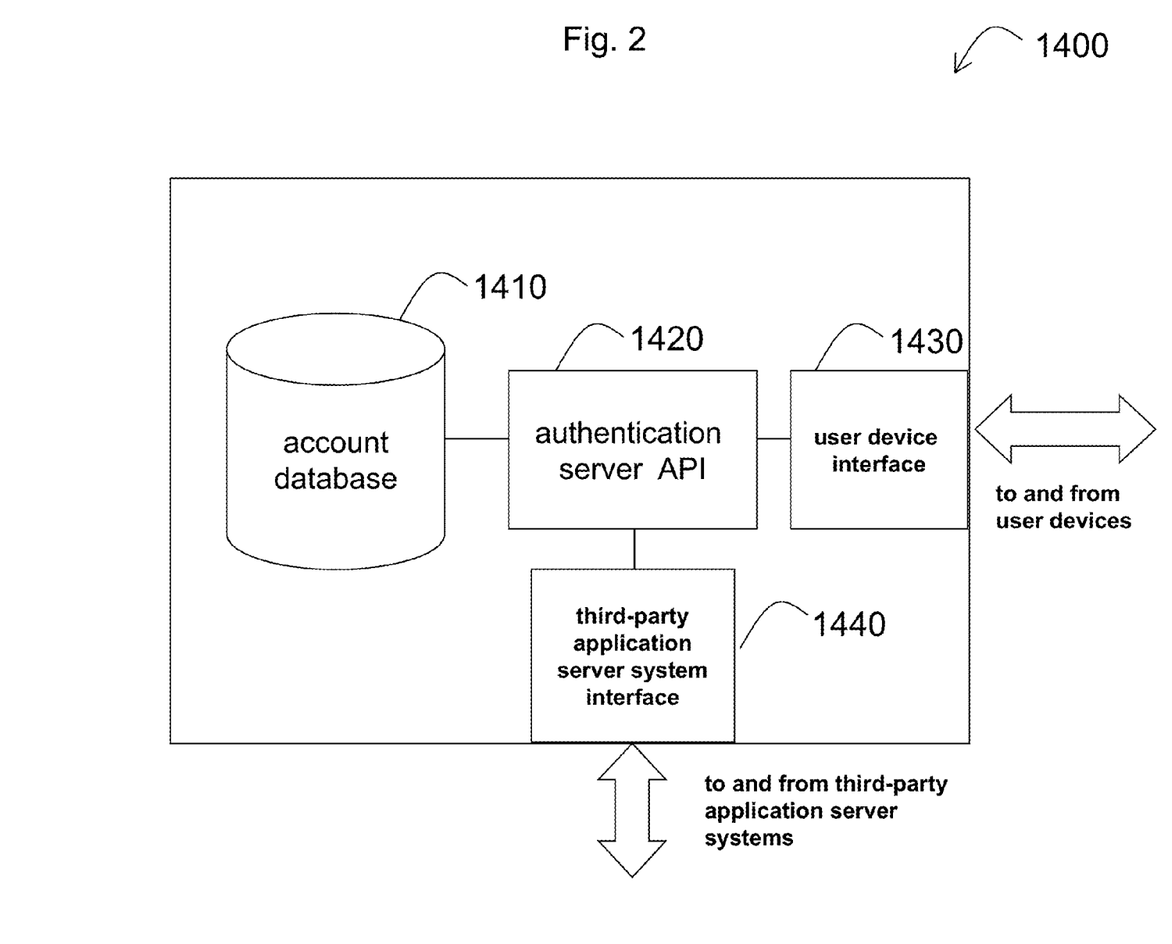
FIG. 2 is an exemplary diagram of a network connected authentication server system according to an embodiment of the present invention.

Turning to FIG. 2, a diagram of an authentication server system 1400 according to an embodiment is shown. The authentication server system 1400 includes a user device interface 1430 implemented with technology known in the art for communication with user devices 1200, 1300. The authentication server system 1400 also includes a third party application server system interface 1440 implemented with technology known in the art for communication with third party application server system (TPA) 1500. As will be described in more detail below, the authentication server system 1400 further includes an authentication server application program interface (API) 1420 that authenticates user of the third party application server system 1500 and user devices 1200, 1300. The authentication server API 1420 is coupled to a user account database 1410 to store user accounts as will be described below. The database 1410 may be implemented with technology known in the art, such as relational database and/or object oriented database.

Figure 3A:
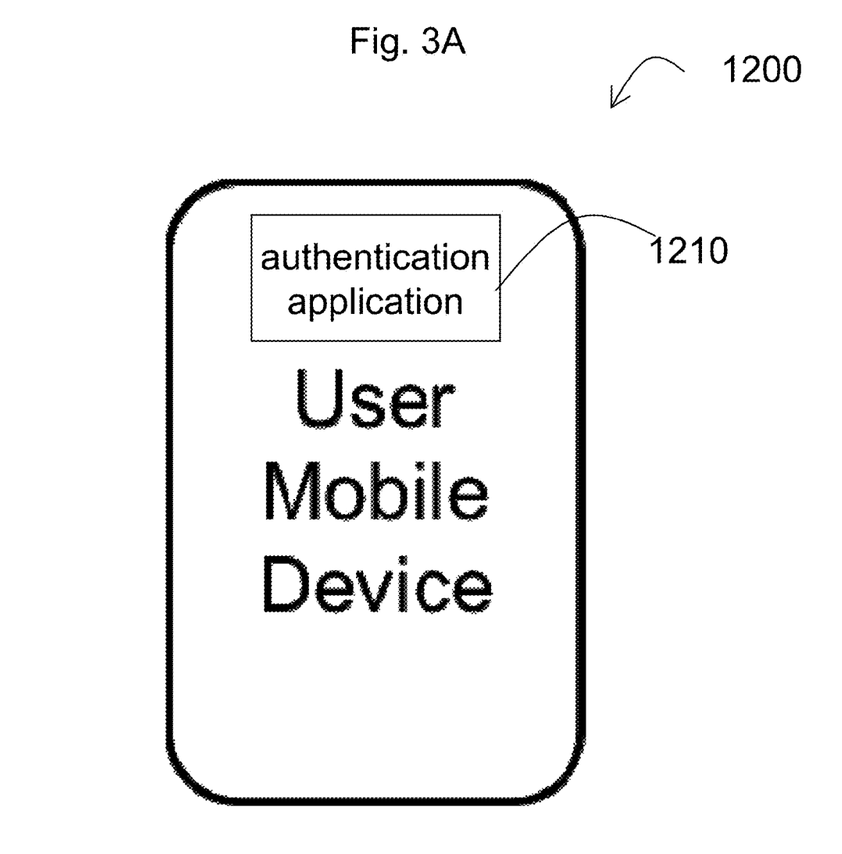
FIG. 3A is an exemplary diagram of a user device according to an embodiment of the present invention.

Turning to FIG. 3A, a diagram of a user mobile device 1200 according to an embodiment is shown. The user mobile device 1200 includes a network connected authentication application 1210 that is installed in, pushed to, or downloaded to the user mobile device 1200.

In an embodiment, a network connected authentication application 1210 is installed in, pushed to, or downloaded to a user mobile device 1200, 1300. The user of the application 1210 creates a user account with the authentication server system 1400 and pairs (associates) the user mobile device 1200, 1300 with the user account. The user will also provide to the authentication server system 1400 one or more forms of identification, such as email addresses or phone numbers, for verification.

The authentication server system 1400 may include a database 1410 where information is kept regarding the association of users to groups. A user may belong to any number of groups. A user may also be coupled to one or more devices. Groups are subject to a number of permissions that may differ with third party application authentication requirements, which are also referred herein as third party application rules or policies. Preferably, a group satisfies internal group requirements when it has permissions to authenticate with a third party application server system 1500 of the authentication platform 1000. These third party application's requirements may include, but are not limited to, approval from a minimum percentage of the group members, or certain members within the group have more or lesser consequence to the group's authentication capabilities, and so on. It is noted that the third party applications may have their own independent authentication requirements which are used independently on the application server system 1500, and are separate from the requirements that are known to the authentication server system 1400.

In an embodiment, the authentication server system 1400 receives authentication requests from one or more third party applications at the third party application server system 1500. The authentication server system 1400 then notifies user devices 1200, 1300 that can authenticate the authentication requests. After receiving the authentication responses from the user devices 1200, 1300, the authentication server system 1400 relays the responses to the one or more third party applications at the third party application server system 1500. This allows a plurality of users (such as in a group) to participate in the authentication. The authentication responses are either approval or denial. Preferably, communication among the user devices 1200, 1300, the authentication server system 1400, and the third party application server system 1500 is encrypted using one or more encryption technologies known in the art.

In an embodiment, the authentication server system 1400 may not send authentication requests to all other members of the group. The authentication server system 1400 may send authentication requests to a small number of members that are required to have the authentication approved, and send to more members only if more member authentications are needed. In another embodiment, one or more members may manually trigger polling of the authentication server system 1400 to receive requests, such that the authentication server system 1400 may not need to notify these one or more members of the group.

In another embodiment, the authentication server system 1400 may send authentication requests in a specific sequence where one or more members' approvals are necessary before the authentication server system 1400 sends authentication requests to other members. A denial from a preliminary required member may abort the remainder of the authentication as it fails to meet the policy's requirements.

In an embodiment, the authentication server system 1400 may verify the authenticity of the user devices before passing on the authentication responses to the third party application server system 1500. The authentication server system 1400 may verify the authenticity of the user devices by confirming the signature of the response message using public key signature confirmation or evaluating other attributes and information from the user devices.

In an embodiment, additional constraints may be placed on the user devices for extra security before allowing an authentication. The extra security may include, but is not limited to, geo-location rules defining where the device may be, forced use of multiple factors of authentication, or proximity to other members within the group as determined by GPS, Bluetooth, or the like.

In an embodiment, the users have the capability to create groups, and the authentication server system 1400 designates the creating user as the administrator with the ability to define the authentication rules and enrollment requirements. Those requirements may be open enrollment allowing any willing user to join. Or users may only join strictly by invitation. The associations of users belonging to which groups are kept in the authentication server system 1400's database 1410. The administrator may add a set of user identifiers to the group. A user identifier is associated with one or more devices that the user owns, is registered to, has authority to use, or the like. When the identifier is entered, the database is used to figure out which devices are associated with it.

In an embodiment, the users have unique identifiers that are used to identify them within a group. The group itself has a unique identifier, which is supplied by the authentication server system 1400 and used to initialize the authentication process to a third party application. The group identifier is separate from user identifier. Both types of identifiers are not static. They may be set, changed or rotated by the user or the group without affecting the user's and the group's ability to authenticate or be identified to third party applications. Security is a reason, among others, for the ability to provide non-static identifiers. A user may enter the group identifier at a provided interface of a third party application server system 1500, e.g., a web page, a short range communication interface, and so on. Alternatively, if the third party application server system 1500 does not provide an interface, the user may initiate an authentication if the user knows the third party application's identifier the user wants to authenticate to. The user may connect to the third party application server system 1500 through any available digital communications channel available and compatible with the user's device and let the device pass along the group identifier.

Once the authentication server system 1400 receives the group identifier and the third party application's identifier, the authentication server system 1400 retrieves the third party application's requirements from the database 1410. If there is a whitelist then the requesting group must be in that list in order to proceed. In an embodiment, the third party application may have security requirements that will force certain minimum requirements to be imposed on the group and the users even if it is not mandated specifically in the group's rules or by the individual users. These requirements may include, but are not limited to, a minimum number of users in the group that must approve, a minimum percentage of users in the group that must approve, geographical boundaries the approving users must be located within, a minimum number of authentication factors that must be validated by each of the authenticating users' devices, and so on.

Figure 3B:
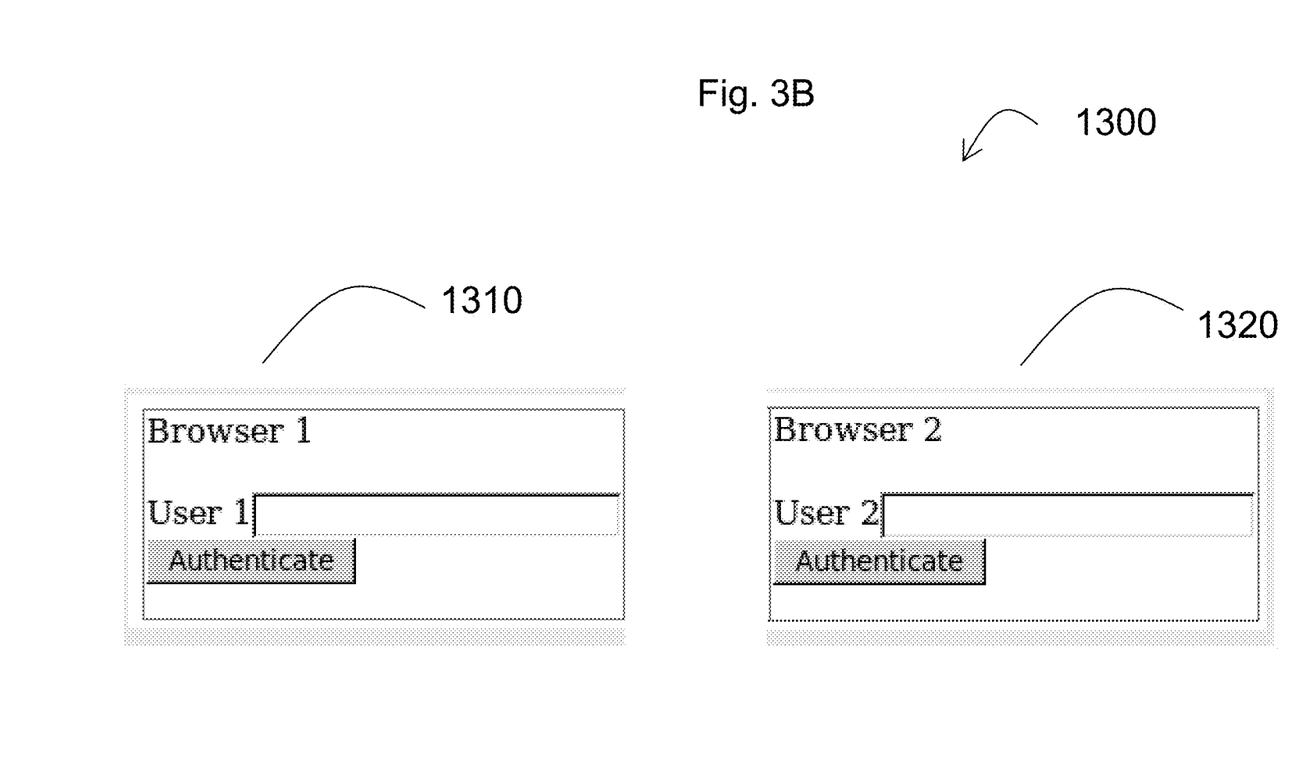
FIG. 3B illustrates two exemplary user interfaces at two user devices for the user to perform authentication according to an embodiment of the present invention.
Figure 3C:
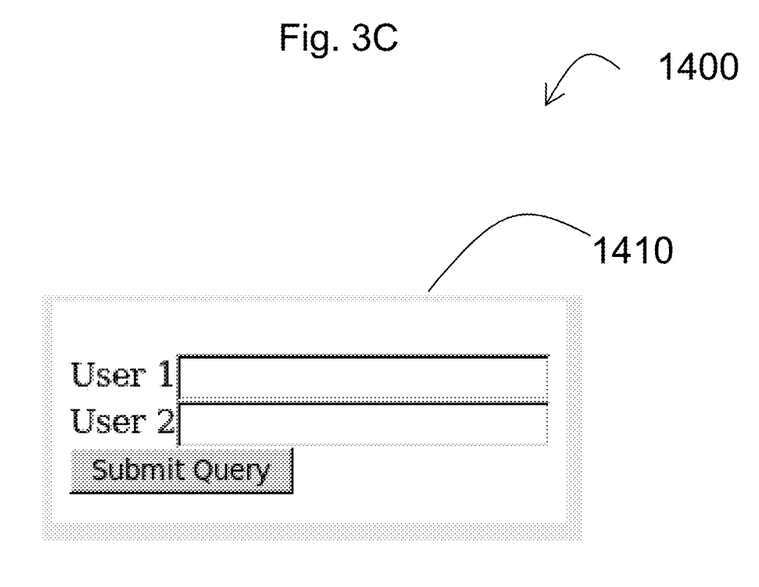
FIG. 3C illustrates an exemplary user interface at a user device for two users to perform authentication according to an embodiment of the present invention.
Figure 3D:
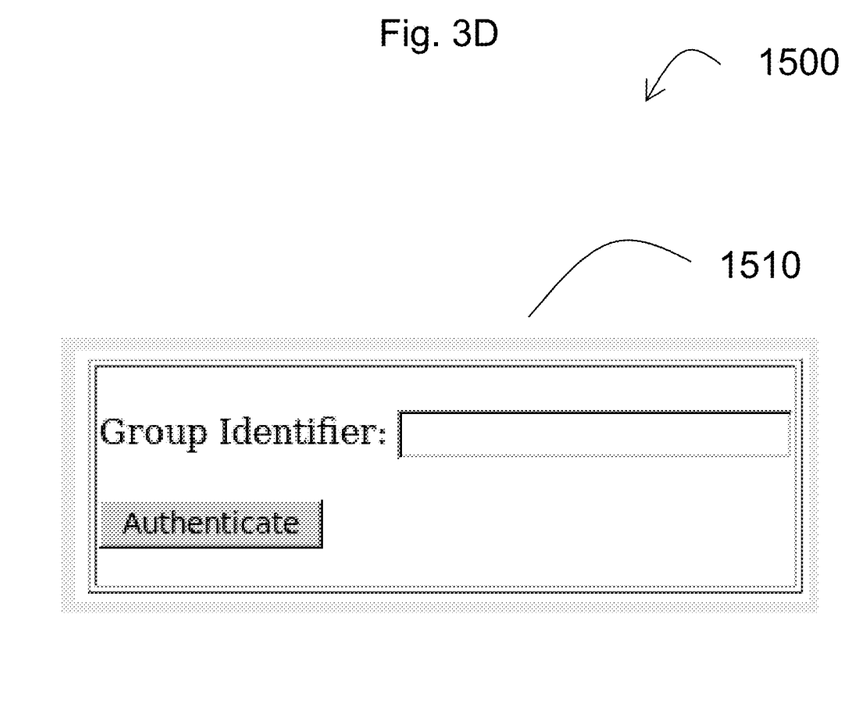
FIG. 3D illustrates an exemplary user interface at a user device for the user to perform a group authentication according to an embodiment of the present invention.

If the authentication server system 1400 determines that all requirements are met and the authentication can proceed, the authentication server system 1400 sends out notifications to the devices of the users in the group. Devices not capable of receiving notifications may send a manually triggered requests (e.g., polling) to the authentication server system 1400 in order to retrieve the authentication requests. In an embodiment, it is up to the users at this point to approve or deny these requests; a non-response may be considered a denial. As illustrated in an example in FIG. 3B, two users (User 1 and User 2) on two separate user devices are notified and presented at their respective devices with a user interface 1310 and 1320 to authenticate, using their respective user identifiers. In an example illustrated in FIG. 3C, two separate users (User 1 and User 2) are associated with the same user device, are notified and presented with a user interface 1410 to authenticate, using their respective user identifiers. In other example, a user's action may require a group authentication. In this example, the authentication server platform 1000 may present the user interface 1510 as illustrated in FIG. 3C at respective user devices to indicate a group authentication, using the respective group identifier.

The group may have rules imposed on it aside from the third party application's requirements which can be referenced in the database 1410. If both the group and the third party application have requirements, both will need to be satisfied for authentication. In the event the rules conflict, the stricter rules will apply. For example, one rule may require 50% of the group to authenticate; another rule may require 60%. The stricter rule is 60% requirement. A user and a user's device may have their own rules for authentication imposed on top of the group and third party application's requirements. These follow the same guidelines where they will also be required and in the event of a conflict the stricter rules always have preference.

The authentication server system 1400 collects the responses from the group. For each response, the authentication server system 1400 determines if any necessary rule is not met. If any necessary rule is not met, the authentication server system 1400 invalidates that response. A response from a single user not meeting the requirements may only invalidate that user and not the group. When group requirements are not fulfilled, the authentication server system 1400 invalidates the entire group. If all requirements are fulfilled, the authentication server system 1400 sends the valid responses to the third party application at the third party application server system 1500. The third party application then collects the responses for the purpose of determining whether or not authentication should be granted or denied.

In an embodiment where the authentication server system 1400 is unable to directly send the authentication responses to the third party application, an encrypted message containing the authentication responses meant for the third party application may be relayed through one or more of the group's devices to the third party application. For example, this may be instances where a third party application is not connected to a network but can be communicated with locally using proximity based communication such as Bluetooth, Near Field Communication, audio transmissions, infrared, a direct wired link, and so on.

For illustration, an exemplary usage of the authentication platform 1000 is now illustrated. A group has multiple user members where each user is in possession of a network-connected mobile device 1200. A group user wishes to access a network-connected protected resource, such as at a third party application server system 1500. In this illustration, the resource requires the individual approval from each member of the group, but has no restriction on the locations of the members. A single member of the group, e.g., the user wishing to access the resource, may initiate an authentication request to a protective layer protecting the resource. This is done by the member using an identifier associated with the user member's account on the authentication platform 1000 that is used to protect the described resource. This identifier may be entered at an input interface provided by the third party application, for example, a webpage.

After receiving the authentication request from the requesting member, the third party application sends a request to the authentication server system 1400 which determines whether or not the group is eligible to proceed. Upon determining eligibility to proceed, the authentication server system 1400 inquires all members of the group for approval, which is done by the authentication server system 1400 sending requests to the members' mobile devices 1200. The authentication server system 1400 receives responses from the members' mobile devices 1200. The responses may be encrypted using public-private key cryptography with the public key of the third party application enabling only that application the capability to decrypt and view the responses. The authentication server system 1400 also checks to make sure all imposed requirements by the third party application and the group's policies are fulfilled. Once the minimum threshold is met or passed, the authentication server system 1400 sends the responses to the third party application for final determination of whether or not access should be granted.

For this illustration, when all members have successfully authenticated and the third party application allows access to the protected resource, the appropriately designed third party application allows all members of the group access independent of their locations. Alternatively, an application may be designed to allow access for just the initiating member.

Alternatively, the protected resource may only require a percentage of the group's approvals or be held to a specific rule structure such as a point system where certain users within the group have more or lesser consequence to the group's authentication capabilities. The approval of a higher ranked member within the group may count for, for example, twice that of a lower ranked individual, thus requiring fewer approvals overall to grant access.

Other embodiments of the authentication platform 1000 includes, but are not limited to, usage for enacting an event transactional in nature, such as granting permissions, issuing a message, sending a payment, and so on.

Figure 4:
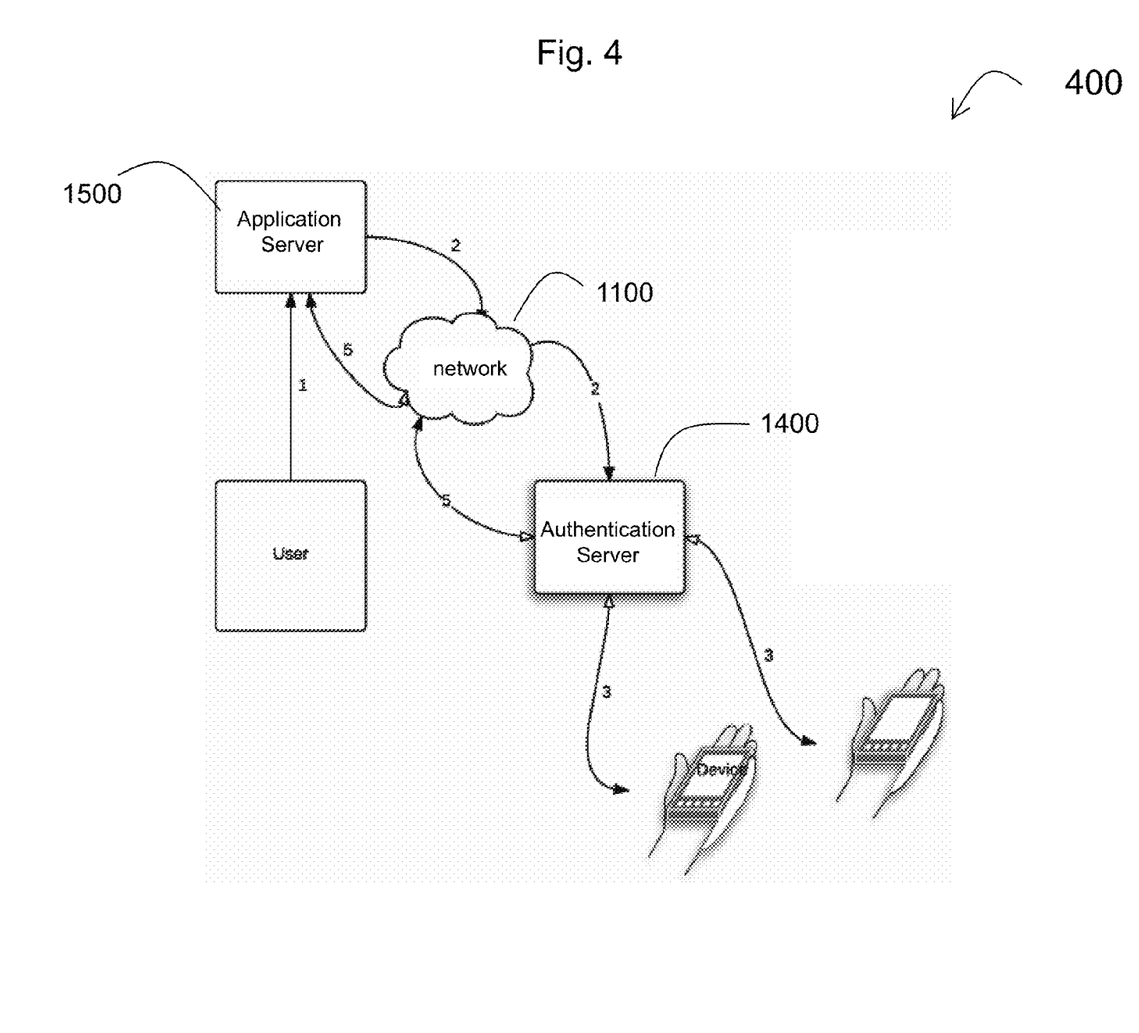
FIG. 4 is an exemplary diagram illustrating a group authentication process of a user according to an embodiment of the present invention.

Turning to FIG. 4, according to an embodiment, a diagram 400 illustrating an operation of the authentication platform 1000 to authenticate a user of a group as described above is shown. A user of a group visits a third party application at a third party application server system 1500 and initiates an authentication request for the group, using a group identifier (Step 1). The third party application server system 1500 sends the group identifier and the third party application's identifier to the authentication server system 1400 via the network 1100 (Step 2). The authentication server system 1400 then retrieves the third party application's requirements from the database 1410. Based on the information retrieved from the database 1410, the authentication server system 1400 sends one or more authentication requests to one or more user devices (Step 3, from Authentication Server to User Device). The authentication server system 1400 uses the group and user identifiers to determine the associated devices. The communications between the authentication server system 1400 and the one or more user devices may be using the Internet, a cellular or wireless network, proximity based communication such as Bluetooth, Near Field Communication, audio transmissions, infrared, a direct wired link, and so on. When the users of the user devices respond to the authentication requests, the authentication application 1210 of the user devices sends the user responses to the authentication server system 1400 (Step 3, from User Device to Authentication Server). The authentication server system 1400 then sends the user responses to the third party application at the third party application server system 1500 (Step 5). At this time, the third party application determines whether approval should be granted based on the responses and on its policies.

Figure 5:
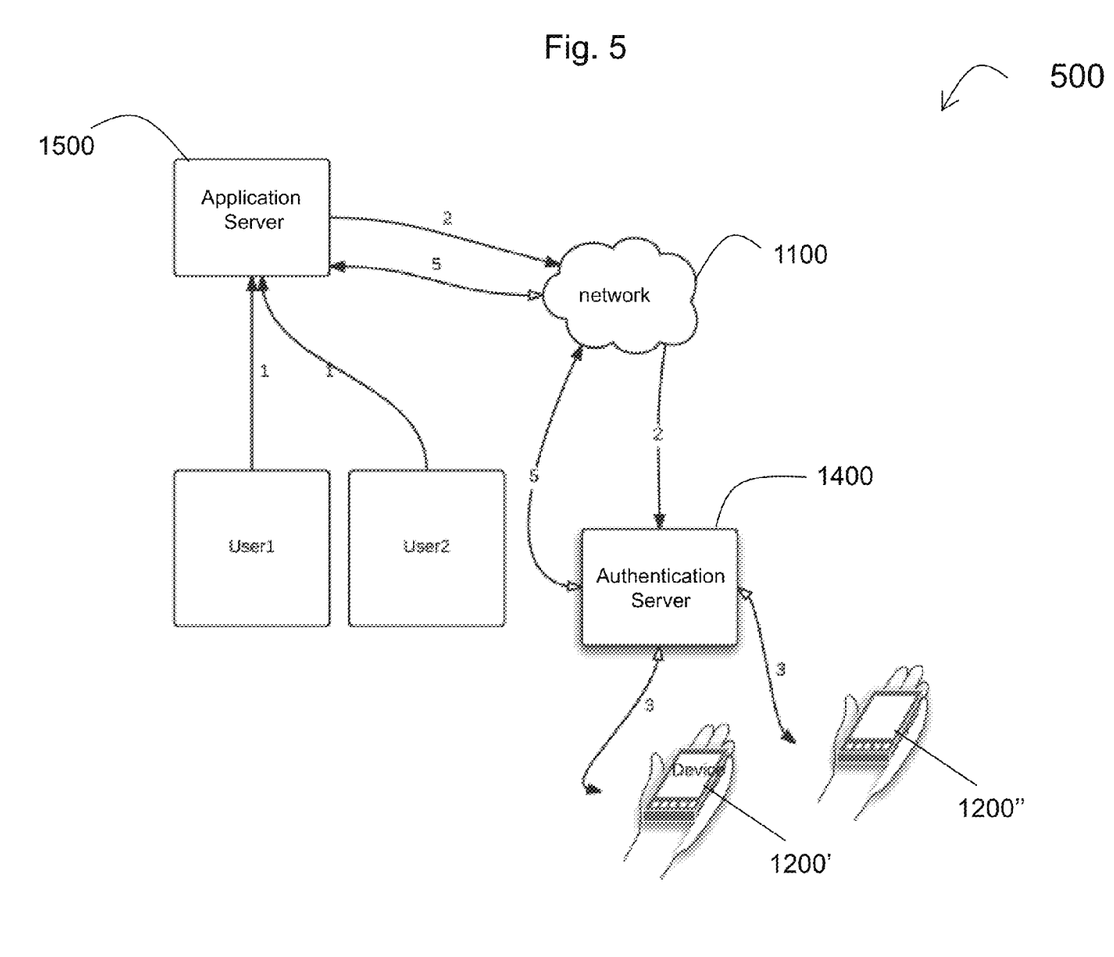
FIG. 5 is an exemplary diagram illustrating a group authentication process of multiple users according to an embodiment of the present invention.

Turning to FIG. 5, according to an embodiment, a diagram 500 illustrating an operation of the authentication platform 1000 to authenticate multiple users of a group as described above is shown. Multiple users, for example, two users as shown, of a group visit a third party application at a third party application server system 1500 and initiate authentication requests for the group, with each user using the user's individual identifier (Step 1). The third party application server system 1500 sends the user identifiers and the third party application's identifier to the authentication server system 1400 via the network 1100 (Step 2). The authentication server system 1400 then retrieves the third party application's requirements from the database 1410. Based on the information retrieved from the database 1410, the authentication server system 1400 sends one or more authentication requests to one or more user devices 1200', 1200" (Step 3, from Authentication Server to User Devices). The communications between the authentication server system 1400 and the one or more user devices may be using the Internet, a cellular or wireless network, proximity based communication such as Bluetooth, Near Field Communication, audio transmissions, infrared, a direct wired link, and so on. When the users of the user devices 1200', 1200" that receive the authentication requests respond to the authentication requests, the authentication application 1210 of the user devices sends the user responses to the authentication server system 1400 (Step 3, from User Devices to Authentication Server). The authentication server system 1400 then sends the user responses to the third party application at the third party application server system 1500 (Step 5). At this time, the third party application determines whether approval should be granted based on the responses and on its policies.

In an embodiment, the authentication server platform 1000 may allow a user to have multiple identifiers associated with multiple devices.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for network connected authentication; however, the invention can be used for any network based authentication in general. Additionally and obviously, features may be added or subtracted as desired. Accordingly, the invention is not to be restricted except in light of the attached claims and their equivalents.

What is claimed is:

1. A network connected authentication system for authenticating a user attempting to connect to at least one of a plurality of third party application servers over a public network, comprising:
   a network connected authentication server system communicatively coupled to a network for access by a plurality of users;
   a database coupled to the network connected authentication server system to store information including at least group identifiers, which uniquely identify a specific subset of the plurality of users, wherein the specific subset includes more than one user, user identifiers, which uniquely identify each of the plurality of users, third party application identifiers, which uniquely identify each of the plurality of third party application servers, and authentication rules;
   wherein the network connected authentication server system has a processor and a non-transitory computer-readable medium containing a sequence of instructions that, when executed by the processor, causes the processor to execute an electronic method for authenticating a first user for at least one of the plurality of third party application servers, said electronic method comprising:
   receiving an authentication request for the first user from the at least one of the plurality of third party application servers, said request including a group identifier and a third party application identifier corresponding to the at least one of the plurality of third party application servers,
   retrieving authentication rules from the database based on the group identifier and the third party application identifier,
   sending authentication request to each of the specific subset of users identified with the group identifier based on the retrieved authentication rules,
   receiving authentication responses from the specific subset of users that the authentication requests were sent to, and
   sending an authentication result based on the received authentication responses to the third party application server requesting authentication for the first user, to determine whether to allow the first user to connect to the third party application server.

2. The network connected authentication system of claim 1, wherein the network connected authentication server system receives a group identifier and a third party application identifier from a third party application of the at least one of the plurality of third party application servers after a user visits the third party application and initiates a group authentication.

3. The network connected authentication system of claim 2, wherein the network connected authentication server system uses the group identifier received from the third party application to determine one or more user identifiers.

4. The network connected authentication system of claim 3, wherein the network connected authentication server system uses the one or more user identifiers to determine one or more user devices.

5. The network connected authentication system of claim 4, wherein communication between the network connected authentication server system and the one or more user devices is encrypted.

6. The network connected authentication system of claim 4, wherein the network connected authentication server system further verifies the authenticity or security of the one or more user devices from which the network connected authentication server system receives authentication responses before the network connected authentication server system sends the authentication responses to the third party application of the at least one of the plurality of third party application servers.

7. The network connected authentication system of claim 4, wherein the one or more user devices send polling requests to the network connected authentication server system in order to retrieve the authentication requests.

8. The network connected authentication system of claim 4, wherein a user device of the one or more user devices acts as a relay device to send the authentication responses to the third party application of the at least one of a plurality of third party application servers.

9. The network connected authentication system of claim 4, wherein the one or more user devices have their own authentication rules.

10. The network connected authentication system of claim 1, wherein communication between the network connected authentication server system and the at least one of a plurality of third party application servers is encrypted.

* * * * *

UNITED STATES PATENT AND TRADEMARK OFFICE
CERTIFICATE OF CORRECTION

PATENT NO. : 9,467,445 B2  
APPLICATION NO. : 14/535196  
DATED : October 11, 2016  
INVENTOR(S) : Devin M. Egan et al.

Page 1 of 1

It is certified that error appears in the above-identified patent and that said Letters Patent is hereby corrected as shown below:

On the Title Page

Item (60) should be corrected to read

-- Provisional application No. 61/901,718, filed on Nov. 8, 2013 --

Signed and Sealed this  
Seventh Day of March, 2017

Michelle K. Lee  
*Director of the United States Patent and Trademark Office*